United States Patent
Kawai

(10) Patent No.: US 8,396,829 B2
(45) Date of Patent: Mar. 12, 2013

(54) DOCUMENT MANAGEMENT SYSTEM, DOCUMENT MANAGEMENT METHOD, AND COMPUTER READABLE MEDIUM STORING PROGRAM THEREFOR

(75) Inventor: Yoshikazu Kawai, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 169 days.

(21) Appl. No.: 12/764,600

(22) Filed: Apr. 21, 2010

(65) Prior Publication Data

US 2011/0131175 A1 Jun. 2, 2011

(30) Foreign Application Priority Data

Dec. 2, 2009 (JP) ................................. 2009-274240

(51) Int. Cl.
*G06F 17/00* (2006.01)

(52) U.S. Cl. .................. 707/608; 707/783; 707/784

(58) Field of Classification Search .................. 707/608, 707/783, 784
See application file for complete search history.

(56) References Cited

U.S. PATENT DOCUMENTS

| | | | | |
|---|---|---|---|---|
| 6,078,925 A * | 6/2000 | Anderson et al. | ............. | 707/784 |
| 6,928,425 B2 * | 8/2005 | Grefenstette et al. | ......... | 707/783 |
| 7,532,757 B2 * | 5/2009 | Yoshida et al. | ............... | 382/180 |
| 7,573,615 B2 * | 8/2009 | Kasatani | ...................... | 358/402 |
| 7,590,617 B1 * | 9/2009 | Voigt et al. | ............. | 707/999.003 |
| 7,593,120 B2 * | 9/2009 | Kitora et al. | .................. | 358/1.13 |
| 7,668,800 B2 * | 2/2010 | Motoyama et al. | ........... | 707/947 |
| 7,681,121 B2 * | 3/2010 | Nishikawa et al. | ........... | 715/243 |
| 7,698,316 B2 * | 4/2010 | Song et al. | ..................... | 707/608 |
| 7,752,286 B2 * | 7/2010 | Anderson et al. | ............. | 709/217 |
| 7,788,218 B2 * | 8/2010 | Gerritsen et al. | ............. | 707/608 |
| 7,933,889 B2 * | 4/2011 | Smetters et al. | ............... | 707/708 |
| 2004/0239700 A1 * | 12/2004 | Baschy | ......................... | 345/781 |
| 2005/0134896 A1 * | 6/2005 | Koga | ............................. | 713/200 |
| 2009/0284780 A1 * | 11/2009 | Kitora et al. | ................. | 358/1.13 |
| 2010/0011282 A1 * | 1/2010 | Dollard et al. | ................ | 707/102 |
| 2010/0218240 A1 * | 8/2010 | Chiruvolu | ......................... | 726/5 |

FOREIGN PATENT DOCUMENTS

JP A-2008-217652 9/2008

* cited by examiner

*Primary Examiner* — Rehana Perveen
*Assistant Examiner* — Tiffany Thuy Bui
(74) *Attorney, Agent, or Firm* — Oliff & Berridge, PLC

(57) ABSTRACT

A document management system includes a memory and a controller. The memory stores access privilege information configured to define, for each display style of a document element displayed in an electronic document, privileges of users or user groups regarding access to a document element having a display style. In response to a request from a user to perform an operation on a document element in an electronic document, the controller controls whether the operation is executed or not on the document element, using the access privilege information stored in the memory, in accordance with a privilege among privileges of the users or user groups for a display style of the document element, the privilege being a privilege of the user or a user group to which the user belongs.

5 Claims, 6 Drawing Sheets

DOCUMENT MANAGEMENT SYSTEM, DOCUMENT MANAGEMENT METHOD, AND COMPUTER READABLE MEDIUM STORING PROGRAM THEREFOR

CROSS-REFERENCE TO RELATED APPLICATIONS

This application is based on and claims priority under 35 USC 119 from Japanese Patent Application No. 2009-274240 filed Dec. 2, 2009.

BACKGROUND

The present invention relates to a document management system, a document management method, and a computer readable medium storing a program therefor.

SUMMARY

According to an aspect of the invention, there is provided a document management system including a memory and a controller. The memory stores access privilege information configured to define, for each display style of a document element displayed in an electronic document, privileges of users or user groups regarding access to a document element having a display style. In response to a request from a user to perform an operation on a document element in an electronic document, the controller controls whether the operation is executed or not on the document element, using the access privilege information stored in the memory, in accordance with a privilege among privileges of the users or user groups for a display style of the document element, the privilege being a privilege of the user or a user group to which the user belongs.

BRIEF DESCRIPTION OF THE DRAWINGS

Exemplary embodiment(s) of the present invention will be described in detail based on the following figures, wherein.

DETAILED DESCRIPTION

Figure 1:
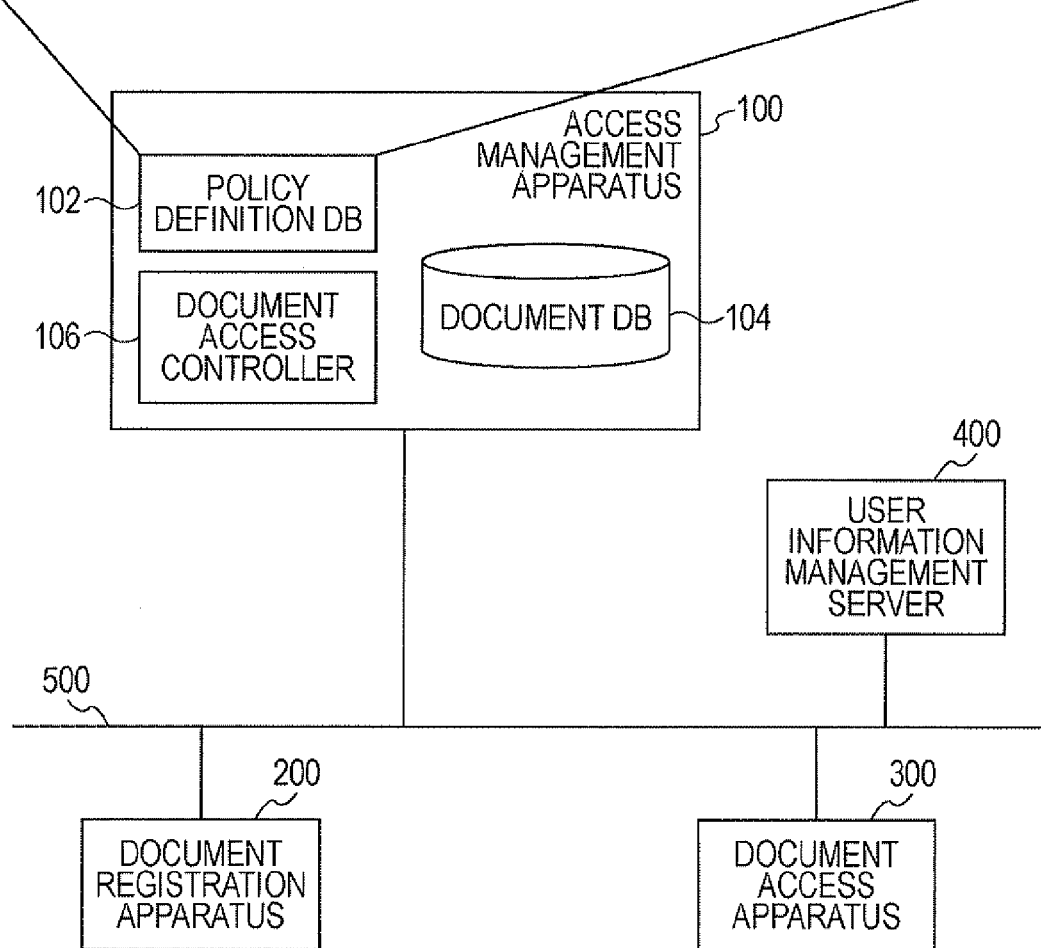
FIG. 1 illustrates an example configuration of a system according to an exemplary embodiment.

In the following description, the term "electronic document" means a document represented by digital data. Typical examples of an electronic document include, but are not limited to, a document file created using an application program such as a word processor program or a spreadsheet program and a file including an image obtained by optically reading a paper document. The term "document element" means an element of an electronic document, and examples of a document element include, but are not limited to, a character, a character string, and a figure. An electronic document may be segmented into one or more document elements. In the following exemplary embodiment, the access or use of an electronic document by a user is controlled in units of document elements.

An example configuration of a system according to an exemplary embodiment will now be described with reference to FIG. 1. The system includes an access management apparatus 100, a document registration apparatus 200, and a document access apparatus 300, which are connected to one another via a network 500 such as a local area network.

The access management apparatus 100 may be an apparatus configured to manage the access or use of electronic documents by users, and includes a policy definition database (DB) 102, a document DB 104, and a document access controller 106.

The policy definition DB 102 stores security policy definition information, which may be information for defining privileges of users regarding access to an electronic document. In the exemplary embodiment, by way of example, access of a user to a document element is controlled based on the font color of the document element. The term "font color" means the color of a document element in a document, such as the color of a character or the color of a figure. It is to be understood that the term "font color" is not limited to the color of a font but is used as the generic name for the document element to avoid confusion. For example, in the example illustrated in FIG. 1, the policy definition DB 102 contains, for each of three font colors of black, blue, and red, information about the presence or absence of viewing and printing privileges of each user or each user group for document elements of the font color. The term "user group" refers to a group including one or more users (or individuals). The illustrated example is based on the assumption of document access management in a certain company, and three groups that represent job titles are provided: "general employee", "section manager or higher (lower than department manager)", and "department manager or higher". From another point of view, the illustrated three groups may also represent levels of security (confidentiality of information) or levels of authorized privilege.

Information indicating which group each user belongs to is registered in the user information management server 400. In the example of the policy definition illustrated in FIG. 1, for example, all the "general employee", "section manager or higher", and "department manager or higher" users are allowed to view elements colored in black, such as characters and figures, but the "general employee" users are not allowed to print the elements. Further, the "general employee" users are not allowed to view or print elements colored in blue, such as characters. The "section manager or higher (lower than department manager)" users are allowed to only view elements colored in blue, such as characters, and the "department manager or higher" users are allowed to view and print elements colored in blue. The "general employee" users and the "section manager or higher (lower than department manager)" users are not allowed to even view elements colored in red, such as characters. The "department manager or higher" users are allowed to not only view but also print elements colored in red. In the illustrated example, therefore, the security level increases (that is, the number of operations that users are allowed to perform decreases and the security level increases) in the order of black, blue, and red.

The policy definition illustrated in FIG. 1 is merely an example. In the example illustrated in FIG. 1, operation privileges are restricted in units of groups based on, for example, job titles. However, operation privileges may be restricted in units of groups or personal users based on other criteria.

The document DB 104 contains electronic documents registered using the document registration apparatus 200. Unique identification information (called document IDs) may be added to the registered electronic documents to facilitate management of the electronic documents.

In response to an inquiry from the document access apparatus 300 about whether an operation to be performed or not on an electronic document registered in the document DB 104 is permitted, the document access controller 106 refers to the policy definition DB 102 and makes a response. The operation of the document access controller 106 will be described in detail below.

The document registration apparatus 200 may be an apparatus used to register an electronic document in the document DB 104 of the access management apparatus 100. The document registration apparatus 200 may be implemented using a device connected to a network, such as a scanner, a multi-function device (a device having the functions of a printer, a scanner, a copier, and other suitable devices), or a personal computer.

In the exemplary embodiment, by way of example, when a document author creates a document containing text, figures, etc., on paper using a pen, contents with low confidentiality may be written with a black pen, contents with intermediate confidentiality may be written with a blue pen, and contents with high confidentiality may be written with a red pen. Desirably, the document author is thoroughly familiar with the policy definition illustrated in FIG. 1. In practice, however, it may be sufficient that the document author has general knowledge that confidentiality (or the security level) increases in the order of black, blue, and red and also has common sense about what kind of information is considered highly confidential.

When a paper document is created by writing by hand in this manner, a registerer or a person in charge of registration of the document, who may or may not be the same as the author, operates the document registration apparatus 200, namely, a scanner, to read an image of the document, and sends an instruction to the access management apparatus 100 to register the document. Upon receipt of the instruction, the access management apparatus 100 creates an electronic document including the read document mage, and transmits the electronic document to the access management apparatus 100 via the network 500. The access management apparatus 100 registers the received electronic document in the document DB 104. In this case, the access management apparatus 100 may analyze the document image included in the electronic document, extract document elements included in the document image, create management information indicating the font colors of the extracted document elements, and register the management information in the document DB 104 in association with the electronic document. The document elements may be extracted using an existing method. For example, a set of connected components, which may be a collection of adjacent pixels regarded as having the same color, may be extracted from the document image, and the set of connected components may be used as a single document element. Alternatively, connected components of the same color which are located within a predetermined distance may be integrated into a single document element. Any other method may also be used.

In the foregoing description, objects on a paper document are read using a scanner, by way of example. In another example, a digital pen may be used to capture as digital data the strokes of the pen on paper. In this case, similarly, the colors of objects written with the pen may differ. Any type of digital pen may be used such as one that reads coordinates embedded in paper in the vicinity of the tip of the pen using a small built-in scanner or one that reads the position of the tip of the pen using a reflected wave of an ultrasonic signal or any other signal emitted from a transmitter/receiver placed on a sheet. For example, a digital pen having pen cores of plural colors, like a multi-color ballpoint pen, may be used, and information indicating which color of pen core is selected may be managed in association with information about the movement of the tip of the pen which has been read (or the column of coordinates read at each time point). In this case, the document registration apparatus 200 adds the information about the movement of the tip of the pen (or the pen strokes), and the corresponding color information to document data indicating a paper template in which items are to be written, such as a billing form, to generate an electronic document indicating the written items. In this case, the document registration apparatus 200 (or the digital pen) may integrate pieces of information about strokes of the tip of the pen, whose coordinates are close together in a predetermined range and which are associated with the same color information, into a single document element as a series of written contents. The data of a document element generated in this manner includes a group of strokes and color information.

The electronic document generated by the document registration apparatus 200 in the above manner generally includes data of plural document elements such as those described above. The generated electronic document is sent from the document registration apparatus 200 to the access management apparatus 100, and is registered in the document DB 104.

An electronic document including a confidential element, which may be written in a distinctive color such as red or blue, may be created using an application such as a word processor application, and may be registered in the access management apparatus 100 using the document registration apparatus 200 or the computer in which the application is executed.

The document access apparatus 300 may be an apparatus used by a user to access an electronic document registered in the document DB 104, and may be, for example, a personal computer. In the example illustrated in FIG. 1, "viewing" and "printing" are illustrated by way of example as the methods of accessing or using electronic documents, that is, the types of operations that users may perform on electronic documents. The document access apparatus 300 has installed therein software (hereinafter referred to as "viewer") for allowing a user to handle an electronic document obtained from the document DB 104. In the following example, by way of example, the viewer does not permit an operation to be performed on an electronic document, which has been requested from a user who merely owns the file of the electronic document, until the user acquires privilege information indicating an access privilege (or a "license") for authorized access to the electronic document, within the privileges defined by the privilege information.

Figure 2:
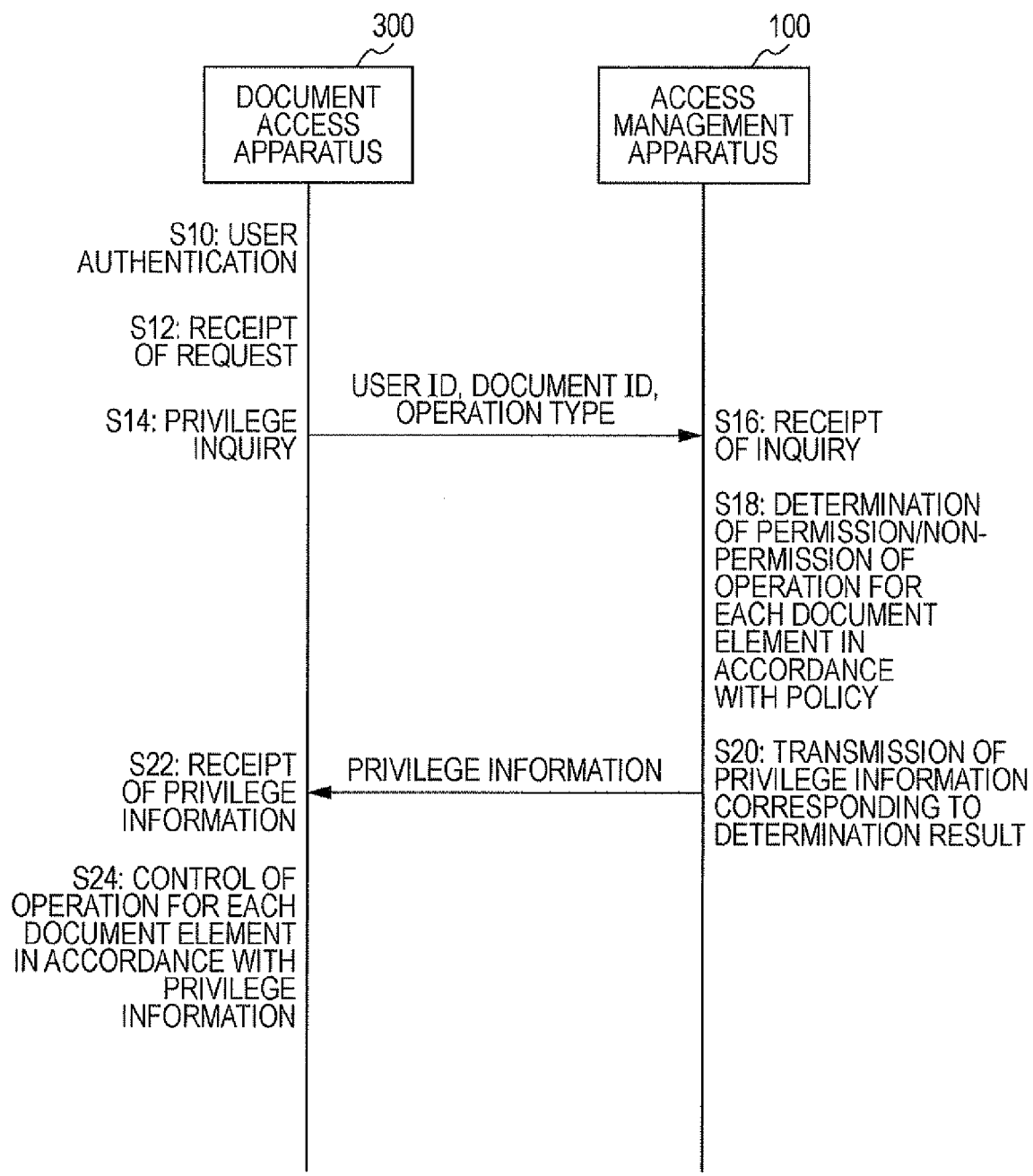
FIG. 2 illustrates an example of a document operation procedure according to the exemplary embodiment.

An example of a procedure for performing an operation on an electronic document using the document access apparatus 300 will now be described with reference to FIG. 2. First, when a user starts the document access apparatus 300 (in particular, the viewer) or when a user logs in to the access management apparatus 100 via the document access apparatus 300, the document access apparatus 300 or the access management apparatus 100 executes a user authentication process (S10). Identification information (or user ID) about the user is specified through user authentication. Instead of authenticating the user, the document access apparatus 300 or the access management apparatus 100 may ask a dedicated user authentication server to authenticate the user. Then, the document access apparatus 300 receives a request from the user to perform an operation on a certain electronic document (S12). The request may include designation of the electronic document to be accessed and designation of the type of operation to be performed on the electronic document (in the example illustrated in FIG. 1, viewing or printing). The electronic document to be accessed may or may not be stored in the document access apparatus 300. When the user wishes to perform an operation on an electronic document that is not stored in the document access apparatus 300, the user may download the electronic document from the access management apparatus 100 to the document access apparatus 300. Designation of the electronic document to be accessed may be performed by, for example, displaying a list of document titles or thumbnail images of electronic documents stored in either (or both) of the document access apparatus 300 and the document DB 104 on a display of the document access apparatus 300 and allowing the user to select the document title or thumbnail image of a desired electronic document.

When a desired electronic document to be accessed and the type of the operation to be performed on the electronic document are specified and a request is issued, the document access apparatus 300 transmits privilege inquiry information including the document ID of the electronic document, the user ID of the user who has issued the request, and the type of the specified operation to the access management apparatus 100 (S14).

Upon receipt of the privilege inquiry information from the document access apparatus 300 (S16), the document access controller 106 of the access management apparatus 100 determines whether the user is allowed or not to perform the operation on each of document elements in the electronic document in accordance with the policy definition held in the policy definition DB 102 (S18). More specifically, it is determined whether the user specified by the user ID included in the inquiry is allowed or not to perform the operation specified by the type of operation included in the inquiry on each of document elements in the electronic document specified by the document ID included in the inquiry in accordance with the policy definition. In the determination, the font color of each of the document elements is referred to. For example, it is assumed that the policy definition illustrated in FIG. 1 is used and that a "section manager or higher" user instructs "printing" of the electronic document. In this case, the printing of document elements written in red and blue in the document is not permitted. Information about the font color of each document element is included in the data of the electronic document.

In this determination, when the user ID included in the privilege inquiry information is defined in the policy definition, items corresponding to the user ID in the policy definition may be referred to. However, the user ID may not necessarily be defined in the policy definition. For example, in the policy definition illustrated in FIG. 1, users are classified in units of groups. Thus, a personal user ID included in an inquiry is not defined in the definition. In this case, the access management apparatus 100 may ask the user information management server 400 about the group ID of the group to which the user specified by the user ID belongs, and may search the policy definition for information associated with the group ID.

Accordingly, the document access controller 106 creates privilege information indicating whether the specified operation is permitted or not for each document element in the specified electronic document, and transmits the created privilege information to the document access apparatus 300 (S20). The privilege information may include, for example, information that indicates permission or non-permission of an operation in association with the ID of each document element.

Upon receipt of the privilege information (S22), the viewer of the document access apparatus 300 controls whether the operation specified by the user is executed or not on each document element in the electronic document in accordance with the permission or non-permission of the operation to be performed on the document element, which is indicated by the privilege information (S24).

Figure 3:
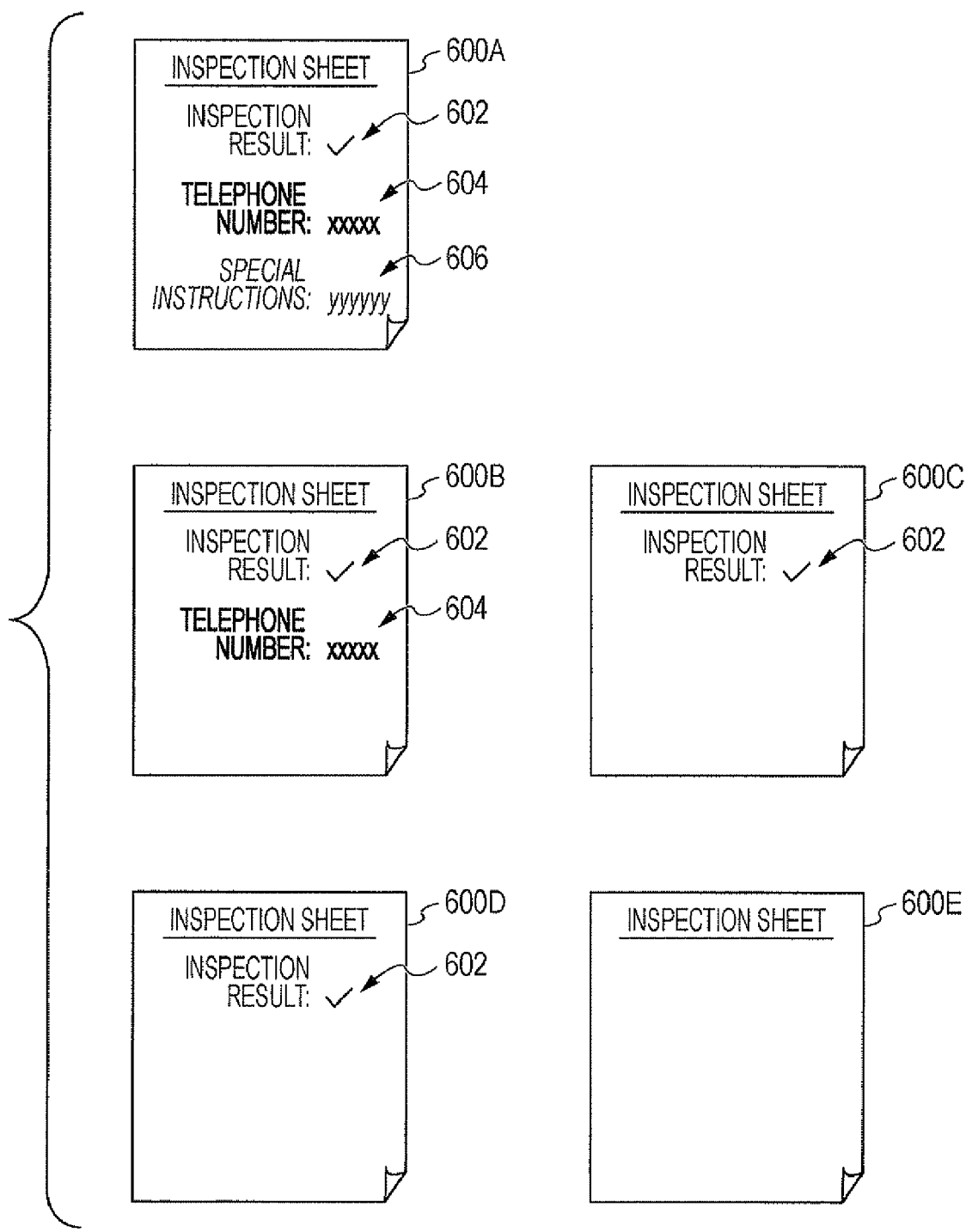
FIG. 3 illustrates an example of a control result according to the exemplary embodiment.

For example, it is assumed that the electronic document to be accessed is a document 600A illustrated in FIG. 3. The document 600A includes a document element 602 written in black, a document element 604 written in blue, and a document element 606 written in red (in FIG. 3, the difference in colors is represented by the difference in typeface instead of actually using different colors). In accordance with the policy definition illustrated in FIG. 1, the "department manager or higher" users are allowed to view and print document elements written in all the font colors. Thus, in response to a viewing and/or printing request from a "department manager or higher" user, the document 600A including all the three document elements 602, 604, and 606 is displayed on a screen or is printed on a sheet. In response to a request from a "section manager or higher (lower than department manager)" user to view the electronic document, as indicated by a document 600B, the document elements 602 and 604 written in black and blue, respectively, are displayed although the document element 606 written in red is not displayed. In response to a request from a "section manager or higher (lower than department manager)" user to print the electronic document, as indicated by a document 600C, the document element 602 written in black is printed although the document elements 604 and 606 written in blue and red, respectively, are not printed. Further, in response to a request from a "general employee" user to view the electronic document, as indicated by a document 600D, the document element 602 written in black is displayed (the document elements 604 and 606 written in blue and red, respectively, are not displayed). In response to a request from a "general employee" user to print the electronic document, as indicated by a document 600E, none of the document elements 602, 604, and 606 written in black, blue, and red, respectively, is printed. In this manner, when an operation is impermissible for document elements written in all the colors in an electronic document, the operation for the electronic document itself may be canceled. For example, the printing of the electronic document itself may be terminated, and an error message may be displayed.

In the above example, operations to be performed on an electronic document have been described in the context of viewing and printing, by way of example. Other operations including editing and copying (of data) may also be conceived. Permission or non-permission of such operations may be controlled based on the color of each document element in a manner similar to that described above.

For example, when a user instructs starting of an operation for editing a certain electronic document, the document access apparatus 300 makes a privilege inquiry. In response to the inquiry, the access management apparatus 100 determines whether the user is allowed or not to edit each document element in the electronic document on the basis of the color of the document element, and returns privilege information including determination results to the document access apparatus 300. The document access apparatus 300 accepts the editing operation requested by the user only for a document element that the user is allowed to edit in accordance with the privilege information. In place of the above procedure, local editing in the document access apparatus 300 may be permitted, and whether each edited result is reflected or not in the corresponding document element in the original electronic document stored in the document DB 104 of the access management apparatus 100 may be controlled for each document element in accordance with a policy definition. In this case, the IDs of document elements edited by the document access apparatus 300 are transmitted to the access management apparatus 100 together with the document ID, the user ID, and operation type information indicating an editing operation. The document access controller 106 of the access management apparatus 100 refers to the policy definition, and determines whether the user is allowed or not to edit each of the edited document elements on the basis of the font color of the document element. The document access controller 106 updates only a document element in the electronic document stored in the document DB 104, which is determined to be editable among the document elements subjected to local editing, by using the result of editing.

In response to a request from a user to copy an electronic document, the access management apparatus 100 may refer to a policy definition, and may determine whether each document element is copyable or not in terms of the combination of the font color of the document element and the accessibility of the user. The document access apparatus 300 creates a copied electronic document including a document element determined to be copyable but not including a document element determined to be non-copyable.

Figure 4:
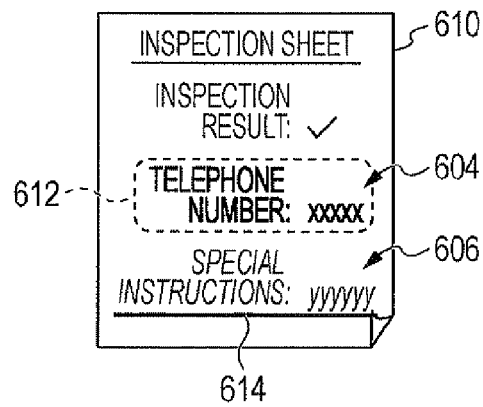
FIG. 4 illustrates an example of decoration elements used to decorate document elements.

In the above example, permission or non-permission of an operation to be performed on a written document element (such as text or a figure) is controlled based on the color of the document element. However, this is merely an example. Alternatively, for example, as illustrated in FIG. 4, the colors of decoration elements added to document elements 604 and 606 on a document 610, such as a text border 612 or an underline 614, may be used. For example, a document element circled or underlined in red may be handled in a manner similar to that of a document element written in red in the above example.

Figure 5:
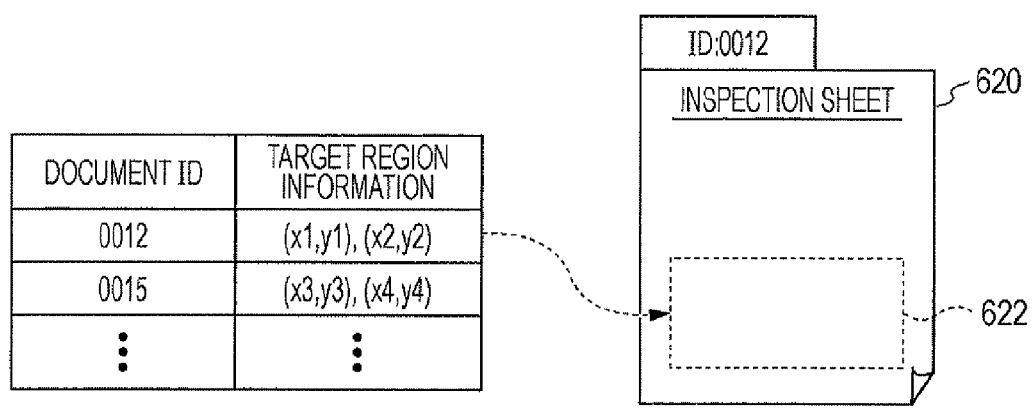
FIG. 5 illustrates an example for defining a target region to be controlled according to the exemplary embodiment.

Further, the control according to the exemplary embodiment may be applied to only a portion of an electronic document. In this case, by way of example, as illustrated in FIG. 5, a region included in an electronic document 620 is specified in advance as a target region 622. Information about the specified target region 622 is stored in the access management apparatus 100. The target region 622 may be individually specified for each electronic document, in which case the access management apparatus 100 may contain information about the target region 622 in association with the document ID of each electronic document. In the example illustrated in FIG. 5, the target region 622 is a rectangular region, and the target region 622 may be represented by the coordinates of two diagonal vertices of the rectangular region. When a target region is defined in this way, the access management apparatus 100 performs the color-based control of permission or non-permission of each operation, as described above, only on document elements within the target region of the electronic document to be accessed. The color-based control of permission or non-permission of each operation may not be performed on document elements outside the target region. Therefore, for example, the "general employee" users are allowed to view or print characters written in red, which are outside the target region 622, even when the policy definition illustrated in FIG. 1 is employed.

Furthermore, the color-based operation permission/non-permission control in units of document elements, as described above, and existing operation privilege control in units of electronic documents may be used in combination. For example, the AND condition of an operation privilege of a user for an electronic document and an operation privilege determined on the basis of the color of each document element may be used to determine whether the user is allowed or not to perform the operation on the document element. For example, when a user has a privilege for viewing an electronic document but does not have a privilege for viewing a document element, a document image not including the document element is displayed to the user.

Figure 6:
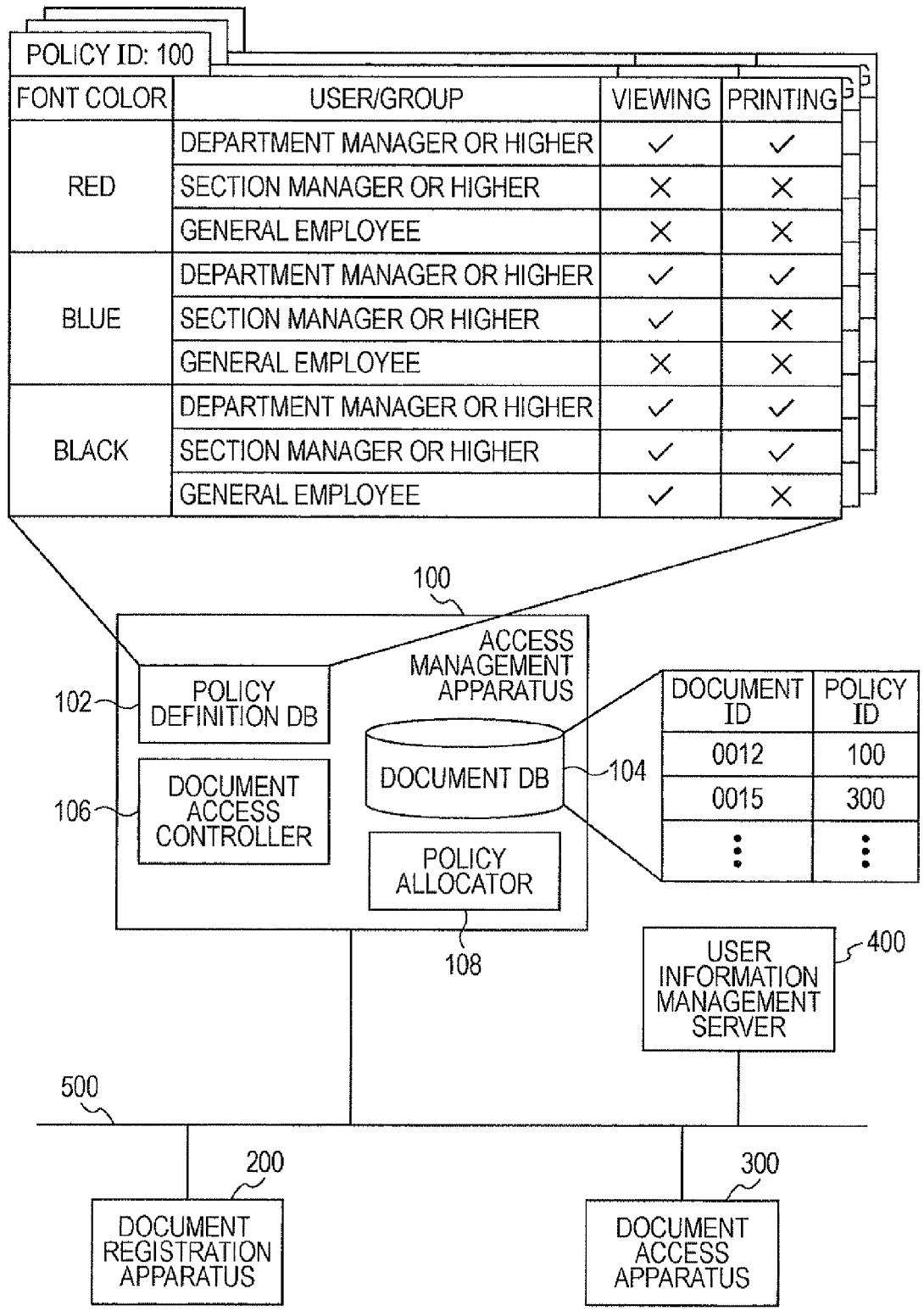
FIG. 6 illustrates an example of policies separately allocated to individual electronic documents.

In the above example, only one policy definition is provided. However, as illustrated in FIG. 6, by way of example, plural policy definitions may be provided, and a policy definition to be applied may be specified for each electronic document. In the illustrated example, when an electronic document is registered in the document DB 104 using the document registration apparatus 200, a policy allocator 108 allocates a policy to the electronic document (that is, specifies a policy definition to be applied to the document). For example, a user who has registered an electronic document using the document registration apparatus 200 or an administrator may allocate a policy by specifying a policy definition to be allocated to the electronic document from among a list of policy definitions provided by the policy allocator 108. The ID (policy ID) of the policy definition allocated to the electronic document is recorded in the document DB 104 in association with the document ID of the electronic document. In the illustrated example, when a user makes a request to perform an operation on an electronic document, the access management apparatus 100 receives a privilege inquiry from the document access apparatus 300 in response to the request, and determines the ID of the policy allocated to the electronic document from the document DB 104 to determine permission or non-permission of the operation in units of document elements in the electronic document in accordance with the policy definition specified by the ID of the policy.

Figure 7:
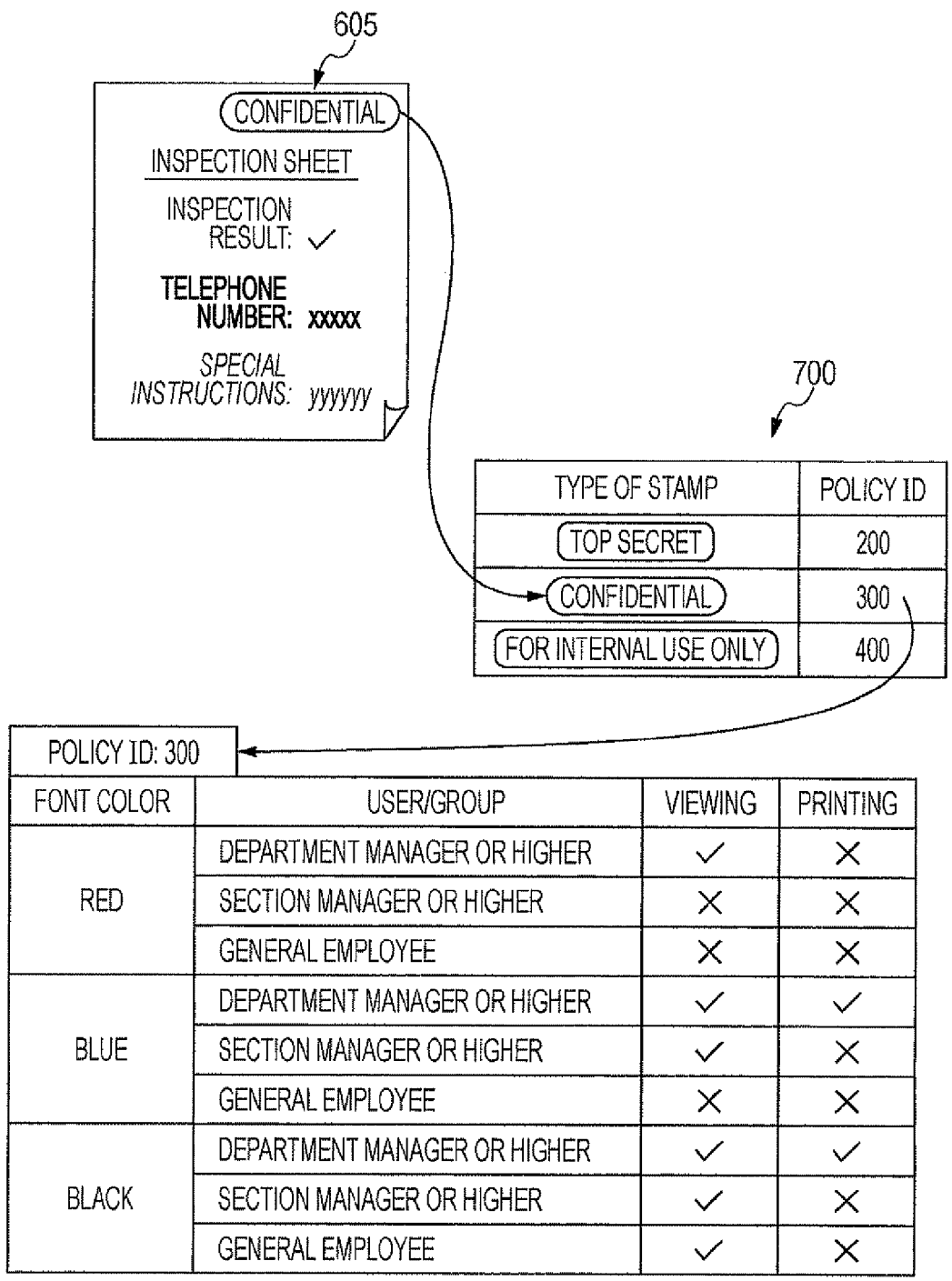
FIG. 7 illustrates an example in which a policy to be allocated to an electronic document is specified using a stamp.

In the illustrated example, a document registerer or any other suitable person selects a policy to be allocated to the corresponding electronic document from a list of policies. However, the method for specifying a policy is not limited to that in the illustrated example. For example, as illustrated in FIG. 7, a policy to be allocated to an electronic document may be specified in accordance with the type of a stamp imprint. Specifically, in the illustrated example, stamp definition information 700 is registered in the access management apparatus 100. The stamp definition information 700 contains policy IDs in correspondence with the types of individual stamped images (or imprints). A document with a stamp 605 illustrated in FIG. 7 is associated with a policy definition having policy ID "300". Instead of using stamps, keywords (for example, "top secret", "for internal use only", etc.) may also be associated with policy IDs, and a policy corresponding to a keyword in an electronic document may be allocated to the electronic document.

In the above example, the access management apparatus 100 issues privilege information in accordance with a privilege inquiry from the document access apparatus 300. However, this is merely an example. Alternatively, in accordance with an inquiry from the document access apparatus 300, the access management apparatus 100 may create an electronic document including only the document element that the requesting user is allowed to perform an operation on (for example, view or print) among document elements in the electronic document, and may return the created electronic document to the document access apparatus 300.

In the foregoing description, furthermore, the access management apparatus 100 manages a policy definition or policy definitions, and the document access apparatus 300 sends an inquiry to the access management apparatus 100. However, this is also merely an example. Alternatively, for example, information about a policy definition may be embedded in an electronic document as a piece of attribute information. In this case, the document access apparatus 300 obtains an electronic document including a policy definition from the access management apparatus 100. In this example, the document access apparatus 300 determines permission or non-permission of an operation for each document element in a manner similar to that of the document access controller 106 described above. Specifically, upon receipt of an instruction from a user to perform an operation on an electronic document, the document access apparatus 300 refers to the policy definition included in the electronic document, and determines for each document element whether or not the operation is permitted. When the user is allowed to perform the requested operation on a document element, the operation is performed on the document element.

In the foregoing description, furthermore, permission or non-permission of an operation is determined based on the color of a document element or the color of a decoration element used to decorate the document element, such as an underline. However, this is also merely an example. Display styles other than colors, for example, the types of lines representing document elements, such as solid lines and broken lines, the thickness of the lines, and the shapes of decoration elements used to decorate the document elements, such as underlines and circular and rectangular borders, may contain information about privileges of each user or group, and permission or non-permission of an operation may be determined for each document element in accordance with the contained information.

The access management apparatus 100, the document registration apparatus 200, and the document access apparatus 300 illustrated, by way of example, in the foregoing description may be implemented by, for example, causing a general-purpose computer to execute a program defining the processes of the functional modules described above. The computer has a circuit configuration in which, for example, hardware components including a microprocessor such as a central processing unit (CPU), memories such as a random access memory (RAM) and a read-only memory (ROM) (primary or internal storage), a hard disk drive (HDD) controller that controls an HDD, various input/output (I/O) interfaces, and a network interface that controls connection to a network such as a local area network are connected to one another via, for example, a bus. Further, a disk drive for reading from and/or writing to portable disk recording media such as a compact disk (CD) and a digital versatile disk (DVD), a memory reader/writer for reading from and/or writing to portable non-volatile recording media compatible with various standards such as a flash memory, and any other suitable device may also be connected to the bus via, for example, an I/O interface. A program implementing the processes of the functional modules illustrated above by way of example may be stored in a fixed storage device such as a hard disk drive from a recording medium such as a CD or a DVD or via a communication medium such as a network, and may be installed into a computer. The program stored in the fixed storage device is read onto the RAM and is executed by the microprocessor such as a CPU, and thereby the functional modules illustrated above by way of example are implemented. All or some of the functional modules may be formed as a hardware circuit such as a dedicated large scale integration (LSI) circuit, an application specific integrated circuit (ASIC), or a field programmable gate array (FPGA).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document management system comprising:
    a memory that stores access privilege information configured to define, for each display style of a document element displayed in an electronic document, privileges of users or user groups regarding access to a document element having a display style;
    a controller that controls whether, in response to a request from a user to perform an operation on a document element in an electronic document, the operation is executed or not on the document element, using the access privilege information stored in the memory, in accordance with a privilege among privileges of the users or user groups for a display style of the document element, the privilege being a privilege of the user or a user group to which the user belongs; and
    a second memory that stores information configured to define a target region to be controlled by the controller within an electronic document,
    wherein the controller does not control whether, in response to a request from a user to perform an operation on a document element in an electronic document, the operation is executed or not on the document element when it is determined, based on the information stored in the second memory, that the document element is not included in the target region in the electronic document, in accordance with the access privilege information, the display style of each document element is used to set the access privilege information for the corresponding document element, and the display style of the document element includes a color of the document element or a color of a decoration element used to decorate the document element.

2. The document management system according to claim 1, wherein the memory stores a plurality of access privilege information, and
    wherein the controller controls whether, in response to a request from a user to perform an operation on a document element in an electronic document, the operation is executed or not on the document element, using access privilege information associated with the electronic document among the plurality of pieces of access privilege information stored in the memory.

3. The document management system according to claim 1, wherein the display style of the document element includes at least one of solid lines, broken lines, a thickness of lines, and the shapes of decoration elements.

4. A document management method comprising:
    storing access privilege information in a memory, the access privilege information being configured to define, for each display style of a document element displayed in an electronic document, privileges of users or user groups regarding access to a document element having a display style;

storing in a second memory information configured to define a target region to be controlled by the controller within an electronic document; and in response to a request from a user to perform an operation on a document element in an electronic document, referring to the access privilege information stored in the memory, and controlling whether the operation is executed or not on the document element in accordance with a privilege among privileges of the users or user groups for a display style of the document element, the privilege being a privilege of the user or a user group to which the user belongs, and not controlling whether, in response to a request from a user to perform an operation on a document element in an electronic document, the operation is executed or not on the document element when it is determined, based on the information stored in the second memory, that the document element is not included in the target region in the electronic document, in accordance with the access privilege information, the display style of each document element is used to set the access privilege information for the corresponding document element, and the display style of the document element includes a color of the document element or a color of a decoration element used to decorate the document element.

5. A non-transitory computer readable medium storing a program causing a computer to execute a process, the process comprising:

storing access privilege information in a memory, the access privilege information being configured to define, for each display style of a document element displayed in an electronic document, privileges of users or user groups regarding access to a document element having a display style;

storing in a second memory information configured to define a target region to be controlled by the controller within an electronic document; and in response to a request from a user to perform an operation on a document element in an electronic document, referring to the access privilege information stored in the memory, and controlling whether the operation is executed or not on the document element in accordance with a privilege among privileges of the users or user groups for a display style of the document element, the privilege being a privilege of the user or a user group to which the user belongs, and not controlling whether, in response to a request from a user to perform an operation on a document element in an electronic document, the operation is executed or not on the document element when it is determined, based on the information stored in the second memory, that the document element is not included in the target region in the electronic document, in accordance with the access privilege information, the display style of each document element is used to set the access privilege information for the corresponding document element, and the display style of the document element includes a color of the document element or a color of a decoration element used to decorate the document element.

* * * * *